US012782328B2

(12) United States Patent
Yokoi

(10) Patent No.: US 12,782,328 B2
(45) Date of Patent: Nov. 3, 2026

(54) COMPONENT MANAGEMENT SYSTEM FOR ANALYSIS DEVICE AND NON-TRANSITORY COMPUTER READABLE RECORDING MEDIUM STORING COMPONENT MANAGEMENT PROGRAM

(71) Applicant: SHIMADZU CORPORATION, Kyoto (JP)

(72) Inventor: Yusuke Yokoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1249 days.

(21) Appl. No.: 17/431,582

(22) PCT Filed: Feb. 28, 2019

(86) PCT No.: PCT/JP2019/007853

§ 371 (c)(1),
(2) Date: Aug. 17, 2021

(87) PCT Pub. No.: WO2020/174664

PCT Pub. Date: Sep. 3, 2020

(65) Prior Publication Data

US 2022/0137013 A1 May 5, 2022

(51) Int. Cl.
*G01N 30/86* (2006.01)
*G01N 30/02* (2006.01)
*G01N 30/32* (2006.01)

(52) U.S. Cl.
CPC ......... *G01N 30/8644* (2013.01); *G01N 30/32* (2013.01); *G01N 30/8651* (2013.01); *G01N 2030/027* (2013.01); *G01N 2030/326* (2013.01)

(58) Field of Classification Search
CPC ............... G01N 30/8644; G01N 30/32; G01N 30/8651; G01N 2030/027;
(Continued)

(56) References Cited

U.S. PATENT DOCUMENTS

2012/0196374 A1* 8/2012 Haga .................. G01N 35/1016 422/67
2014/0039647 A1 2/2014 Fukushima
(Continued)

FOREIGN PATENT DOCUMENTS

CN 104487848 A 4/2015
JP 2006-017600 A 1/2006
(Continued)

OTHER PUBLICATIONS

Notice of Reasons for Refusal in the counterpart Japanese Patent Application No. 2022-157921 dated Oct. 10, 2023, with English machine translation.
(Continued)

*Primary Examiner* — Yossef Korang-Beheshti
(74) *Attorney, Agent, or Firm* — Renner, Otto, Boisselle, & Sklar, LLP

(57) ABSTRACT

A component management system for an analysis device, includes a plurality of analysis devices, and a server connected to the plurality of devices via a network, wherein each analysis device includes an acquirer that acquires a behavior information piece associated with a use amount of a component attached to each analysis device, and a transferer that transfers the behavior information piece acquired by the acquirer to the server, and the server includes a registrar that registers the behavior information pieces received from the plurality of analysis devices in a database, and a comparison information provider that provides comparison information, of a same type of components that are used in the plurality of analysis devices, produced based on the behavior information pieces registered in the database.

8 Claims, 8 Drawing Sheets

(58) Field of Classification Search
CPC ..... G01N 2030/326; G01N 2030/8804; G01N 30/88; G01N 35/00; G06Q 10/00
See application file for complete search history.

(56) References Cited

U.S. PATENT DOCUMENTS

| | | | | |
|---|---|---|---|---|
| 2014/0078182 A1* | 3/2014 | Utsunomiya | ............ G09G 5/37 345/666 |
| 2015/0260742 A1* | 9/2015 | Nakajima | ........ G01N 35/00613 422/63 |
| 2016/0132375 A1 | 5/2016 | Jacobs | |

FOREIGN PATENT DOCUMENTS

| | | | |
|---|---|---|---|
| JP | 2013-108906 A | | 6/2013 |
| JP | 2014-021034 A | | 2/2014 |
| JP | 2014-032022 A | | 2/2014 |
| JP | 2014-235153 A | | 12/2014 |
| JP | 2015102427 A | * | 6/2015 |
| JP | 2016-004022 A | | 1/2016 |

OTHER PUBLICATIONS

Office Action in corresponding Chinese Patent Application No. 201980092254.1 dated Jul. 31, 2024, with English machine translation.
Notice of Reasons for Refusal in the counterpart Japanese Patent Application No. 2022-157921 dated Jul. 4, 2023, with English machine translation.
Office Action for corresponding JP Patent Application No. 2021-501500, dated Mar. 8, 2022, with English machine translation.
International Search Report for corresponding Application No. PCT/JP2019/007853, mailed May 28, 2019.
English Translation of Written Opinion for corresponding Application No. PCT/JP2019/007853, mailed May 28, 2019.
Office Action for corresponding JP Patent Application No. 2021-501500, dated Jul. 5, 2022, with English machine translation.
Decision of Rejection in corresponding Chinese Patent Application No. 201980092254.1 dated Nov. 27, 2024, with English machine translation.
Office Action in corresponding Chinese Patent Application No. 201980092254.1 dated Dec. 18, 2023, with English machine translation.

* cited by examiner

F I G. 4

| COMPONENT | USE AMOUNT | BEHAVIOR INFORMATION |
|---|---|---|
| COMPONENT A | USE COUNT | RETRY COUNT |
| COMPONENT B | USE COUNT | ELECTRICAL PROPERTIES |
| COMPONENT C | LIQUID SENDING AMOUNT | MEAN PRESSURE |

COMPONENT MANAGEMENT SYSTEM FOR ANALYSIS DEVICE AND NON-TRANSITORY COMPUTER READABLE RECORDING MEDIUM STORING COMPONENT MANAGEMENT PROGRAM

TECHNICAL FIELD

The present invention relates to a component management system for an analysis device and a non-transitory computer readable recording medium storing a component management program that utilizes information provided by the component management system.

BACKGROUND ART

A large number of components are used in an analysis device such as a liquid chromatograph. These components include consumables that need to be replaced when a use count reaches a predetermined count. Further, these components include maintenance components that need to be replaced when a use period reaches a predetermined period. The consumables and maintenance components need to be replaced appropriately in order for an analysis device to behave normally. In the below-mentioned Patent Document 1, components are managed by calculation of a scheduled replacement date in accordance with average daily use.

[Patent Document 1] JP 2014-32022 A

SUMMARY OF INVENTION

Technical Problem

Consumables and maintenance components to be used in an analysis device may include a defective product that needs to be replaced before its use count reaches a maximum allowable use count or its use period reaches a maximum allowable use period. In a case where a use count of a component has not reached a use count indicating that the component is to be replaced, or in a case where a use period of a component has not reached a use period indicating that the component is to be replaced, the component is not to be replaced. Therefore, in a case where a defective component is included in components, an error may occur in the analysis device.

The user cannot predict an error of the analysis device caused by a defective component. The user requests a manufacturing company to deal with an error when the error occurs in the analysis device. Therefore, downtime during which the analysis device cannot be used may be prolonged. Further, the manufacturing company must always have a field engineer to respond to an occurrence of such an unexpected error. Further, the manufacturing company needs to always have a stock of replacement parts.

An object of the present invention is to manage components of an analysis device in order to deal with unexpected component replacement for a user.

Solution to Problem

A first aspect of the present invention related to a component management system for an analysis device that includes a plurality of analysis devices, and a server connected to the plurality of devices via a network, wherein each analysis device includes an acquirer that acquires a use amount and a behavior information piece associated with the use amount of a component attached to each analysis device, and a transferer that transfers the use amount and the behavior information piece associated with the use amount acquired by the acquirer to the server, and the server includes a registrar that registers the use amounts and the behavior information pieces associated with the use amounts received from the plurality of analysis devices in a database, and a comparison information provider that provides comparison information, of the use amounts and the behavior information pieces associated with the use amounts of a same type of components that are used in the plurality of analysis devices, produced based on the use amounts and the behavior information pieces associated with the use amounts registered in the database.

Advantageous Effects of Invention

The management system for the analysis device of the present invention enables unexpected component replacement for a user.

BRIEF DESCRIPTION OF THE DRAWINGS

FIG. 4 is a diagram showing the data structure of behavior information.

DESCRIPTION OF EMBODIMENTS

(1) Overall Configuration of Component Management System

Figure 1:
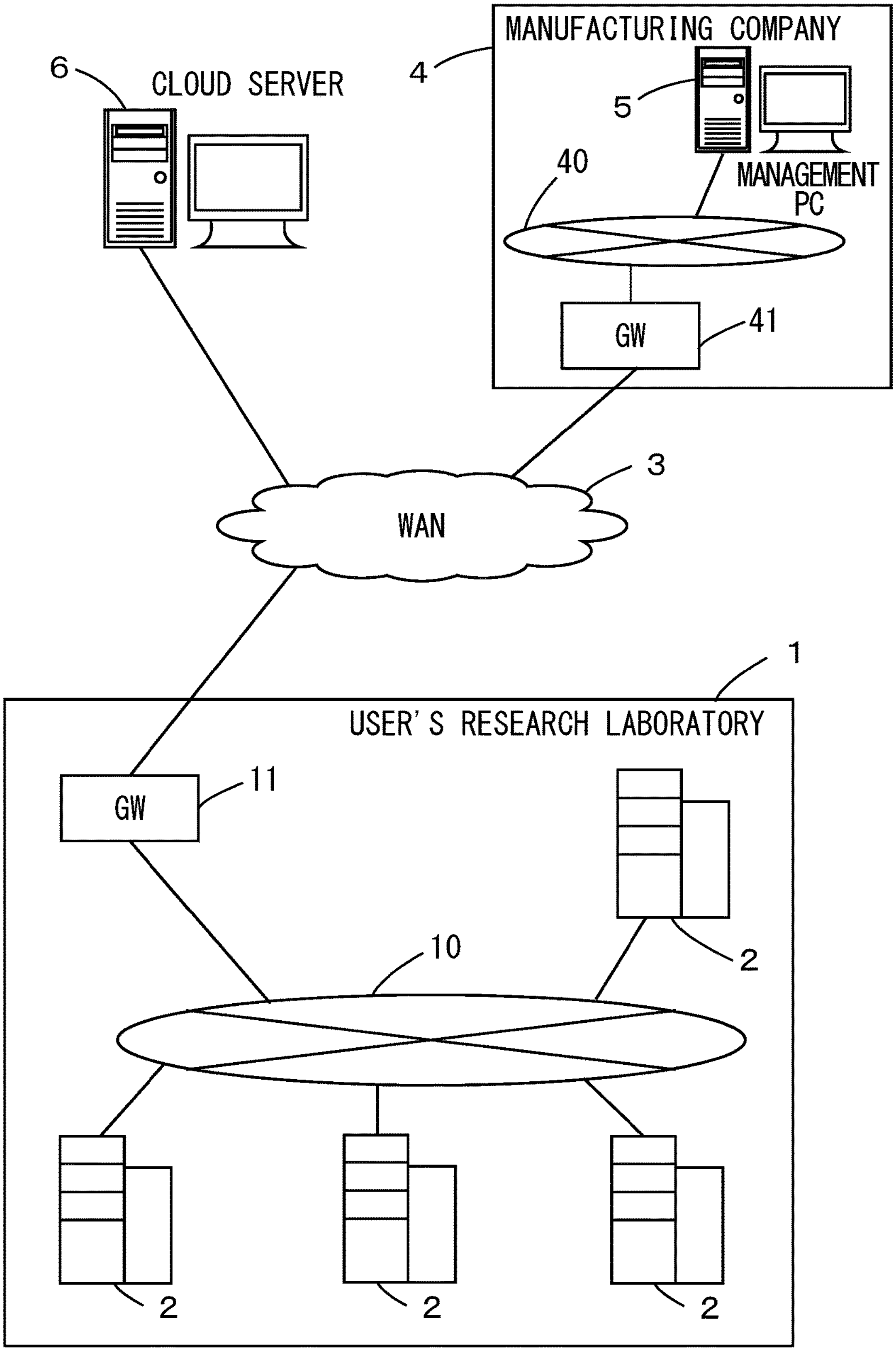
FIG. 1 is an overview of a component management system of a liquid chromatograph according to embodiments.

The configuration of a component management system for a liquid chromatograph according to embodiments of the present invention will be described next with reference to the attached drawings. FIG. 1 is an overview showing the component management system for the liquid chromatograph according to the embodiments. The component management system includes a LAN (Local Area Network) 10 installed in a user's research laboratory, a LAN 40 installed in a manufacturing company 4 and a WAN (Wide Area Network) 3 connected to the LAN 10 and the LAN 40.

A plurality of liquid chromatographs 2 are connected to the LAN 10 in the user's research laboratory 1. The LAN 10 is connected to the WAN 3 via a gateway (GW) 11. The WAN 3 is the Internet, for example.

A management PC (Personal Computer) 5 is connected to the LAN 40 in the manufacturing company 4. The LAN 40 is connected to the WAN 3 via a gateway (GW) 41. The manufacturing company 4 is a company that manufactures the liquid chromatographs 2 installed in the user's research laboratory 1.

A server 6 is connected to the WAN 3. The server 6 is a so-called cloud server. The server 6 is connected to a LAN in a data center connected to the WAN 3, for example. The data center is under strict control, and data stored in the server 6 is secured.

In this manner, the liquid chromatographs 2 are connected to the server 6 via the network including the LAN 10 and the WAN 3. A liquid chromatograph installed at another location is connected to the server 6 via a network in addition to the liquid chromatographs 2 installed in the research laboratory 1 shown in FIG. 1. For example, a liquid chromatograph connected to another LAN at another point is connected to the server 6 via a network.

For example, a plurality of user companies use liquid chromatographs. A large number of liquid chromatographs, connected to each of research laboratories, analysis laboratories and the like of a user company, are connected to the server 6 via a network. As described below, the server 6 manages behavior information of components attached to a plurality of chromatographs connected via networks. That is, in the present embodiment, the behavior information of the plurality of liquid chromatographs is managed in the server 6 in a cloud.

(2) Configuration of Liquid Chromatograph

Figure 2:
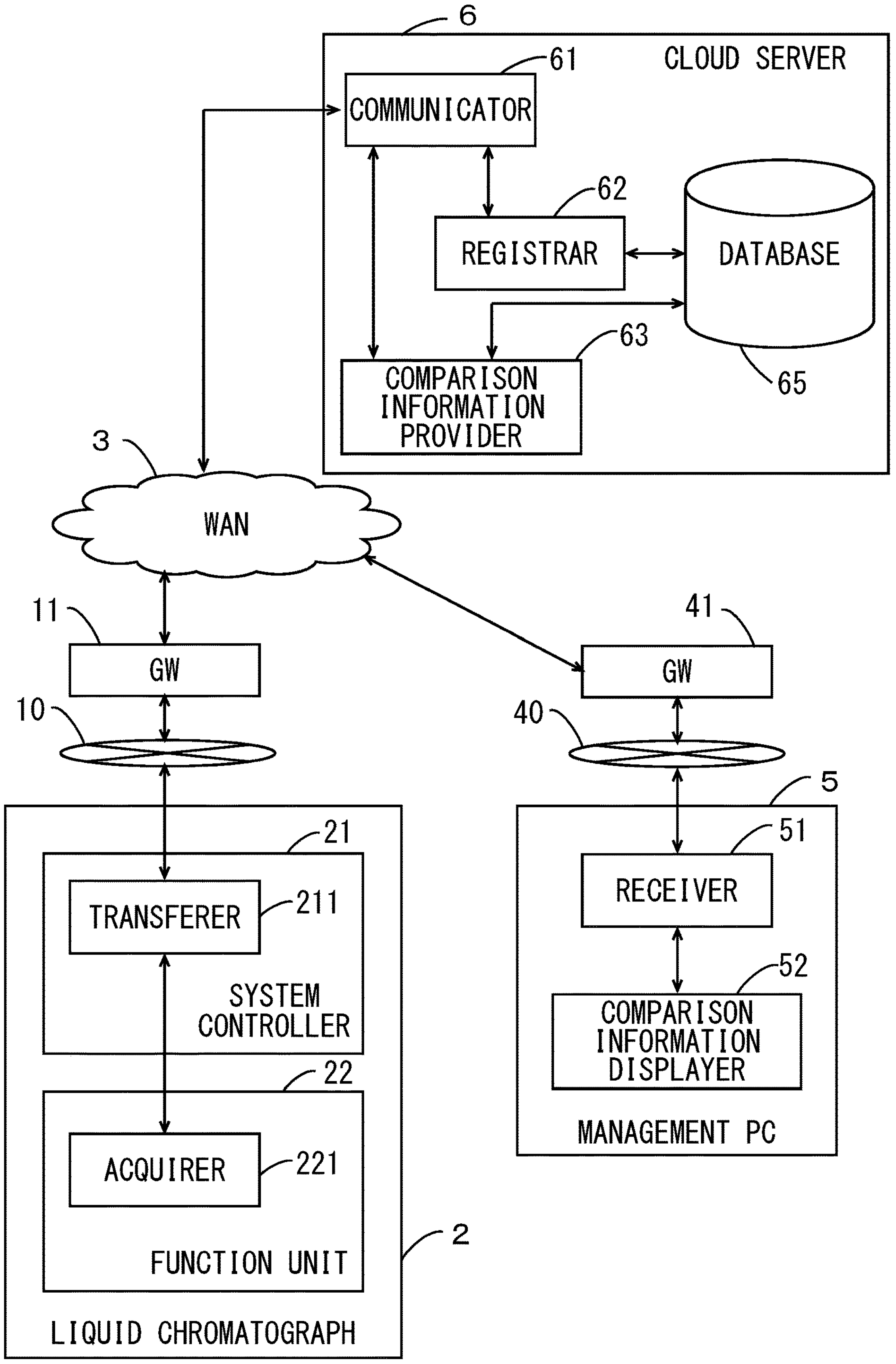
FIG. 2 is a block diagram of the functions of the liquid chromatograph, a server and a management PC according to the embodiments.

FIG. 2 is a block diagram of the functions of a liquid chromatograph 2, the server 6 and a management PC 5. As shown in FIG. 2, the liquid chromatograph 2 includes a system controller 21 and a function unit 22. The system controller 21 controls the entire liquid chromatograph 2. The system controller 21 is connected to the LAN 10.

The liquid chromatograph 2 includes a plurality of function units 22. For example, the liquid chromatograph 2 includes a pump unit, an autosampler unit, a column unit, a detector unit and so on as the function units 22. Each of the function units 22 is connected to the system controller 21 via a communication cable. Each function unit 22 is controlled by the system controller 21.

The system controller 21 includes a transferer 211. The transferer 211 communicates with the server 6 via the LAN 10, the gateway 11 and the WAN 3. The system controller 21 includes a monitor and an operation unit (not shown). An operator makes reference to the monitor included in the system controller 21 to check a state of the liquid chromatograph 2, and performs various setting operations with respect to the liquid chromatograph 2 by operating the operation unit.

Each function unit 22 includes an acquirer 221. As described above, the liquid chromatograph 2 includes the pump unit, the autosampler unit, the column unit, the detector unit and so on as the function units 22. While one function unit 22 is shown in FIG. 2 to represent the plurality of function units 22, each of the plurality of function units 22 includes an acquirer 221.

An acquirer 221 includes a storage, and behavior information of components attached to a function unit 22 is stored in the storage. As described above, each function unit 22 includes an acquirer 221. An acquirer 221 included in each function unit 22 stores behavior information in regard to components attached to the function unit 22. For example, an acquirer 221 of the pump unit stores behavior information of components attached to the pump unit. The content of behavior information of components will be described below.

(3) Configuration of Server

As shown in FIG. 2, the server 6 includes a communicator 61, a registrar 62, a comparison information provider 63 and a database 65. The communicator 61 is connected to the WAN 3. The communicator 61 communicates with the system controller 21 of the liquid chromatograph 2 via the WAN 3, the gateway 11 and the LAN 10. Further, the communicator 61 communicates with the management PC 5 via the WAN 3, the gateway 41 and the LAN 40. The database 65 is a database that manages behavior information acquired via the network.

The communicator 61 receives behavior information from the liquid chromatograph 2. The communicator 61 supplies the received behavior information to the registrar 62. The registrar 62 registers the acquired behavior information in the database 65. As described above, the plurality of liquid chromatographs including the liquid chromatograph 2 shown in FIG. 1 are connected to the server 6. The communicator 61 receives behavior information from the plurality of liquid chromatographs. Then, the registrar 62 registers the behavior information in regard to the components attached to the plurality of liquid chromatographs in the database 65 to centrally manage the behavior information.

The comparison information provider 63 transmits the behavior information of the components registered in the database 65 via the network as the information (comparison information) that can be viewed in the management PC 5.

(4) Functional Configuration of Management PC

As shown in FIG. 2, the management PC 5 includes a receiver 51 and a comparison information displayer 52. As described above, the management PC 5 is connected to the LAN 40 of the manufacturing company 4. The management PC 5 is a computer, which an operator of the manufacturing company 4 uses to maintain and manage the liquid chromatographs 2 provided in the user's research laboratory 1.

Figure 3:
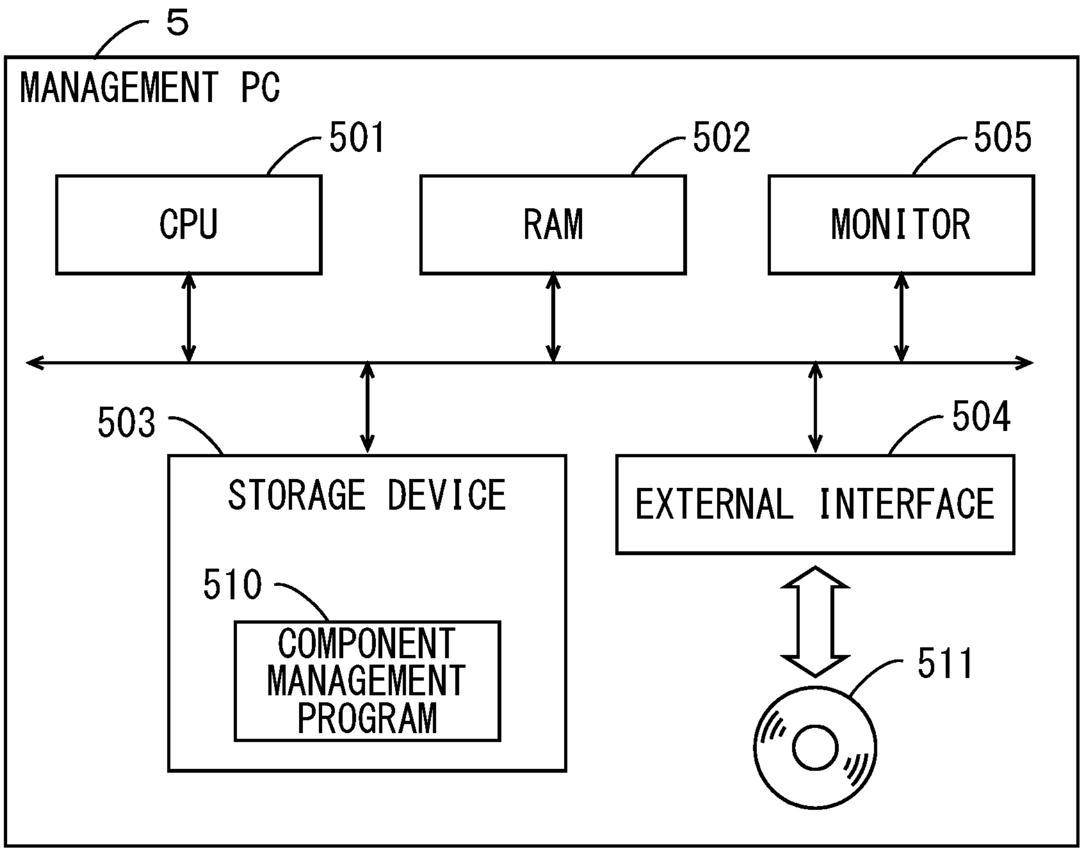
FIG. 3 is a diagram of the configuration of the management PC according to the embodiments.

FIG. 3 is a diagram of the configuration of the management PC 5. The management PC 5 includes a CPU (Central Processing Unit) 501, a RAM (Random Access Memory) 502, a storage device 503, an external interface 504 and a monitor 505. The CPU 501, the RAM 502, the storage device 503, the external interface 504 and the monitor 505 are connected to one another via a bus. A component management program 510 is stored in the storage device 503. As the storage device 503, a hard disc is used, for example. The receiver 51 and the comparison information displayer 52 shown in FIG. 2 are the functions implemented when the component management program 510 shown in FIG. 3 uses the RAM 502 as a work area and is executed on the CPU 501.

(5) Content of Behavior Information

FIG. 4 is a diagram showing the data structure of behavior information stored by an acquirer 221 of a function unit 22. As shown in FIG. 4, the behavior information is associated with a use amount in regard to each component. A type (combination) of a stored use amount and stored behavior information differs depending on a component. In FIG. 4, three examples in regard to the combination of a "component," a "use amount" and "behavior information" are shown.

A first example is the information in regard to a "component A." A "use count" used as the use amount is associated with a "retry count" used as the behavior information. When the power of the liquid chromatograph 2 is turned on, power is also supplied to the "component A," and the "component A" transitions to an initial state. At this time, when the "component A" does not transition to the initial state normally, the function unit 22 including the "component A" retries and causes the "component A" to transition to the initial state. In regard to the "retry count," the number of retries that have been conducted by the function unit 22 to cause the "component A" to transition to the initial state is stored. When the power of the liquid chromatograph 2 is turned on, in a case where the "component A" transitions to the initial state with the first attempt, "0" is stored in regard to the "retry count." The acquirer 221 of the function unit 22 stores the "use count" and the "retry count" of the "component A" in association with each other.

The "component A" is a needle included in the autosampler unit, for example. The autosampler unit includes a motor, a belt and a pulley as mechanisms for driving the needle. The autosampler unit rotates the pulley via the belt by supplying pulses to the motor to drive the needle. The needle is driven by rotation of the pulley. When the power of the liquid chromatograph 2 is turned on, the autosampler unit (function unit 22) determines whether the motor is rotated normally by checking the pulses supplied to the motor and the number of rotations of the pulley. In a case where the relationship between the pulses supplied to the motor and the number of rotations of the motor detected by a sensor is not normal, the autosampler unit retries to supply pulses to the motor. Then, the acquirer 221 of the autosampler unit (function unit 22) stores the "retry count" of retries conducted until the motor is rotated normally in association with the "use count" of the needle.

A second example is information in regard to a "component B." A "use count" used as the use amount is associated with "electrical properties" used as the behavior information. When the liquid chromatograph 2 is used, power is also supplied to the "component B." At this time, the electrical properties such as a current value or a voltage value in the "component B" are detected by a sensor. An acquirer 221 of a function unit 22 including the "component B" stores the "use count" and the "electrical properties" of the "component B" in association with each other.

The "component B" is a D2 lamp (deuterium lamp) included in the detector unit, for example. In this case, the "electrical properties" are a value of a current flowing into the D2 lamp. The detector unit lights the D2 lamp by supplying power to the D2 lamp. In a period during which the liquid chromatograph 2 executes an analysis process, the detector unit (function unit 22) detects a current value of the D2 lamp. Then, the acquirer 221 of the detector unit (function unit 22) stores the "current value" of the D2 lamp in association with the "use count" of the D2 lamp.

A third example is information in regard to a "component C." A "liquid sending amount" used as the use amount is associated with a "mean pressure" used as the behavior information. The "component C" is a liquid sending pump included in the pump unit, for example. The pump unit detects a mean pressure of the liquid sending pump. An acquirer 221 of the pump unit (function unit 22) stores the "mean pressure" of the liquid sending pump in association with the "liquid sending amount" of the liquid sending pump. The pump unit integrates the liquid sending amounts from a point in time at which usage of the liquid sending pump is started, and stores the integrated liquid sending amount, as an index for the use amount of the liquid sending pump.

(6) Content of Database

As described above, an acquirer 221 included in a function unit 22 of the liquid chromatograph 2 stores a "use amount" and "behavior information" in association with each other in regard to each component. Then, the transferer 211 included in the system controller 21 of the liquid chromatograph 2 transfers the information stored by the acquirer 221, that is, the combined information of a "component," the "use amount" and the "behavior information" to the server 6. The registrar 62 of the server 6 registers the combined information, of the "component," the "use amount" and the "behavior information," that is transferred from each liquid chromatograph 2 to the database 65. In this manner, in regard to each of a plurality of components included in the plurality of function units 22 of the plurality of liquid chromatograph 2, a "use amount" and "behavior information" are registered in association with each other in the database 65 of the server 6.

(7) Process Flow of Component Management System

A process flow of the component management system will be described next. First, an acquirer 221 included in a function unit 22 of a liquid chromatograph 2 stores a "use amount" and "behavior information" in association with each other in regard to each component of the function unit 22. This behavior is conducted in the plurality of function units 22 of the plurality of liquid chromatograph 2.

Next, a transferer 211 included in a system controller 21 of the liquid chromatograph 2 transfers information stored by the acquirer 221, that is, combined information of a "component," a "use amount" and "behavior information" to the server 6. Timing for transferring the information by the transferer 211 to the server 6 is not limited in particular. For example, the transferer 211 transfers the information to the server periodically, for example, daily. Alternatively, the transferer 211 transfers the information to the server each time the information is updated.

Next, the registrar 62 of the server 6 registers combined information, of a "component," a "use amount" and "behavior information" that is transferred from each liquid chromatograph 2 in the database 65. The registrar 62 stores the combined information of the "component," the "use amount" and the "behavior information" in the database 65 in association with the information (a user name, installation location and a device name) specifying the device to which the "component" is attached. Thus, the management information in regard to each component of each device (a liquid chromatograph 2) of each user is centrally managed in the database 65.

Next, the comparison information provider 63 of the server 6 transmits the information stored in the database 65 to the management PC 5 as the information that can be compared among devices. That is, in the database 65, the "use amount" and the "behavior information" are registered in association with each other in regard to the same type of components attached to the plurality of liquid chromatographs 2. The comparison information provider 63 produces comparison information based on the "use amount" and the "behavior information" of the same type of components attached to the plurality of liquid chromatographs 2, and transmits the comparison information to the management PC 5.

Next, the receiver 51 of the management PC 5 receives the comparison information transmitted by the comparison information provider 63. The receiver 51 supplies the received comparison information to the comparison information displayer 52. The comparison information displayer 52 causes the monitor 505 of the management PC 5 to display the comparison information transmitted by the comparison information provider 63.

Figure 5:
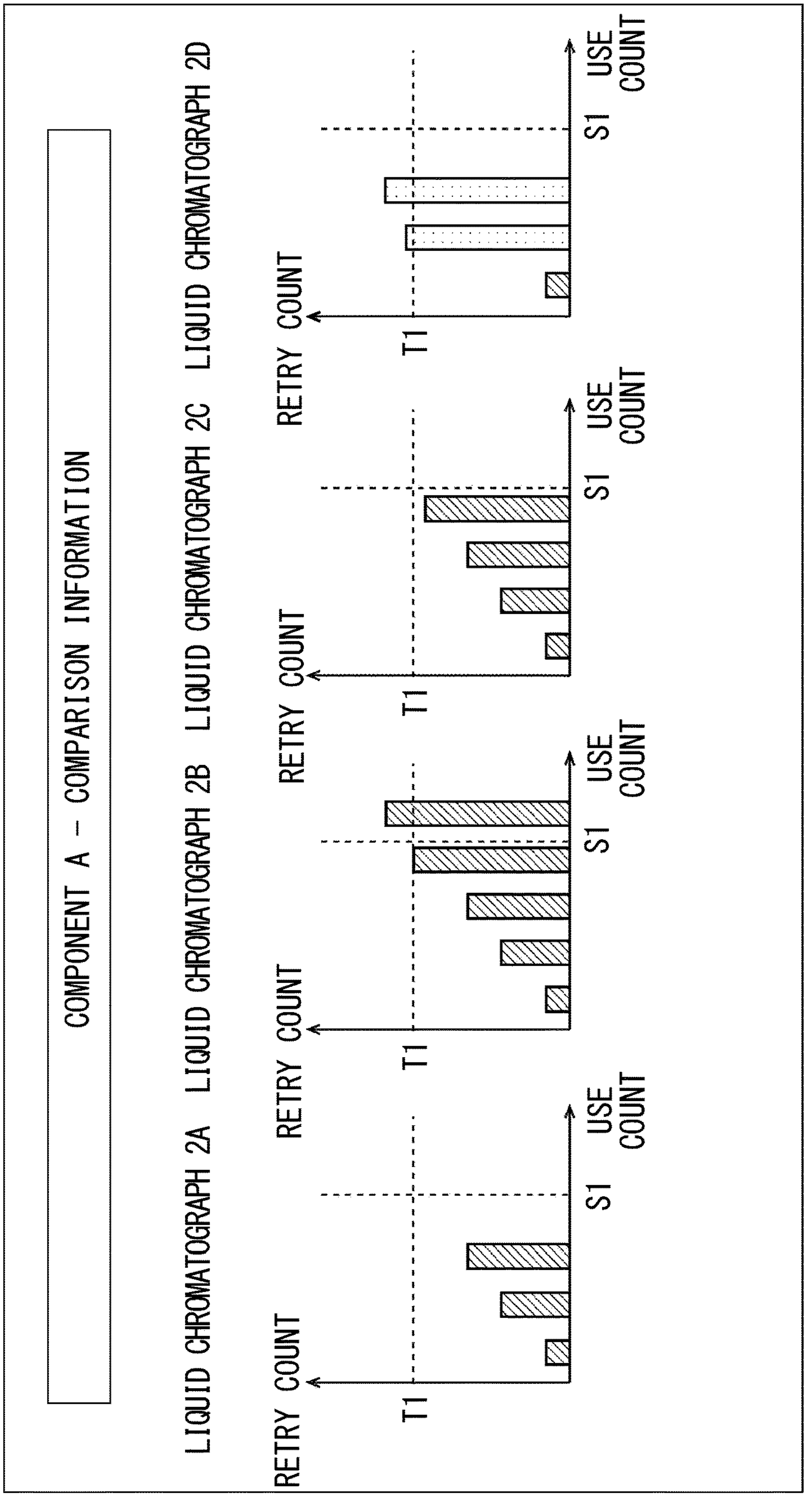
FIG. 5 is graphs showing the comparison of retry counts of a component A displayed on a monitor of the management PC.

FIG. 5 is a diagram showing one example of comparison information displayed on the monitor 505 of the management PC 5. FIG. 5 shows the comparison information in regard to the "component A" shown in FIG. 4. As shown in FIG. 5, as for the respective liquid chromatographs 2A to 2D, the graphs representing information about a "use count" and a "retry count" in regard to the "component A" are displayed on the monitor 505. In a case where the graphs are displayed as shown in FIG. 5 as the information that can be compared among the devices, the information may be processed in the comparison information provider 63 of the server 6 or may be processed in the comparison information displayer 52 of the management PC 5.

In FIG. 5, S1 represents a maximum allowable use count of the "component A." The maximum allowable use count S1 is defined by a component manufacturing company. In FIG. 5, T1 represents a threshold value of a retry count. The component manufacturing company assumes that, in a case where the use count does not exceed the maximum allowable use count S1 of the "component A," the retry count does not exceed the threshold value T1. In other words, the threshold value T1 of the retry count is a maximum allowable retry count for the "component A" that is behaving normally with its use count not exceeding the maximum allowable use count S1. In FIG. 5, as for a "component A" of each of the liquid chromatographs 2A, 2B and 2C, the retry count does not exceed the threshold value T1 before its use count reaches the maximum allowable use count S1. However, as for a "component A" of the liquid chromatograph 2D, the retry count exceeds the threshold value T1 before its use count reaches the maximum allowable use count S1.

Thus, the operator of the manufacturing company 4 that operates the management PC 5 can visually identify that the "component A" of the liquid chromatograph 2D is not behaving normally. That is, it represents that the "component A" of the liquid chromatographs 2 needs to be replaced or maintained even though the use count does not exceed the maximum allowable use count S1. For example, it is considered that the "component A" is a defective product, and the replacement time has arrived when the use count is smaller than the presumed maximum allowable use count S1. Alternatively, it is considered that the replacement time has arrived when the use count is smaller than the maximum allowable use count S1 because the "component A" is excessively worn or deformed due to factors such as use environment or use conditions.

In FIG. 5, the shaded portions in the graphs of the liquid chromatographs 2A to 2C represent normal display. On the contrary, the dotted portions in the graph of the liquid chromatograph 2D represent highlighted display. That is, because the retry count exceeds the threshold value T1 (reference value) before the use count exceeds the maximum allowable use count S1, the portion of the graph exceeding the reference value is highlighted. For example, highlighted graphs are displayed in red in contrast to the other graphs being displayed in black. Alternatively, highlighted graphs blink.

As described above, in a case where the "component A" is the needle of the autosampler, the operator of the manufacturing company 4 can identify that a needle of the liquid chromatograph 2D is not behaving normally. For example, it is considered that the belt winding around the motor is loosen. Thus, appropriate measures such as replacement of the belt or re-tightening of the belt can be taken.

Figure 6:
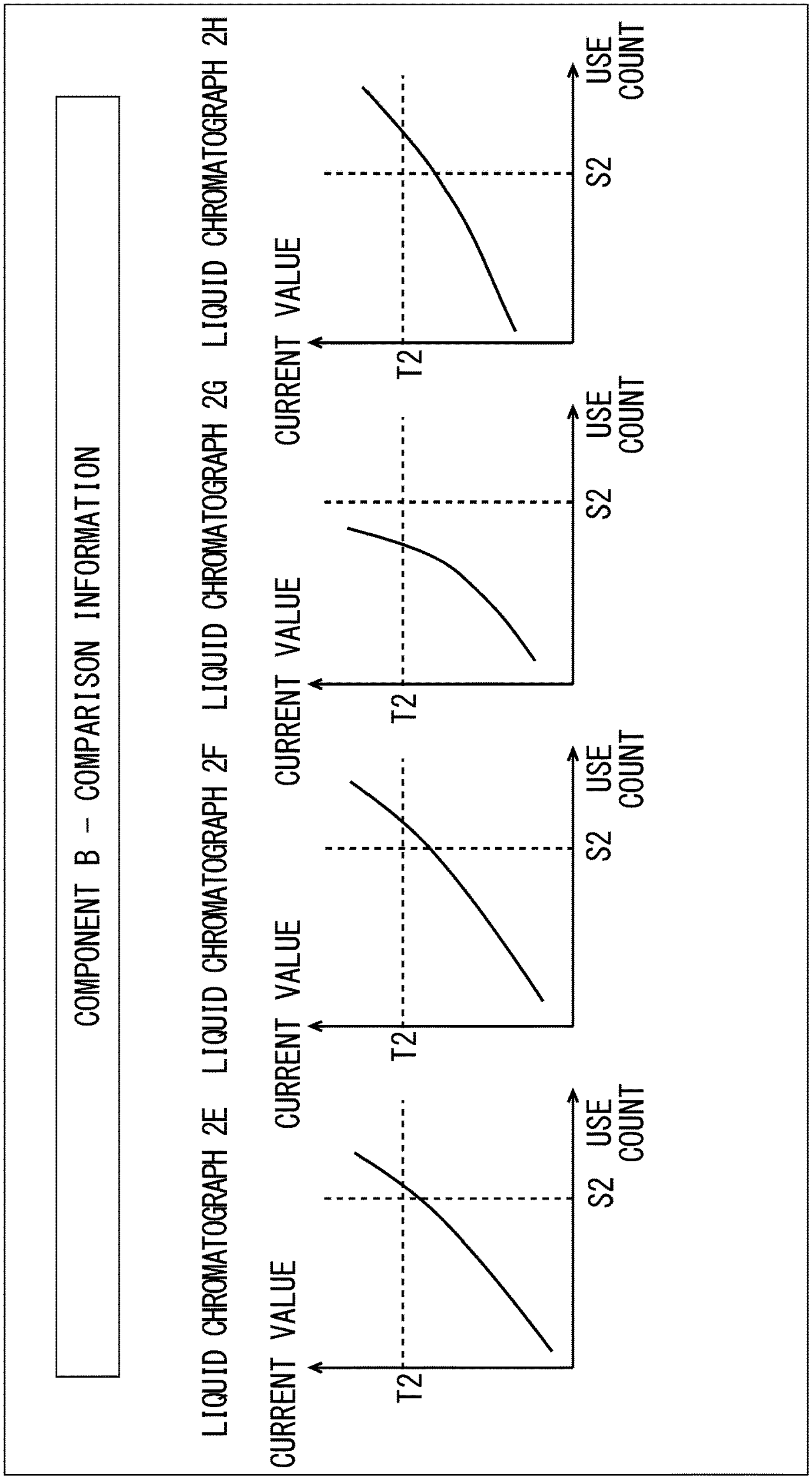
FIG. 6 is graphs showing the comparison of current values of a component B displayed on the monitor of the management PC.

FIG. 6 is a diagram showing another example of comparison information displayed on the monitor 505 of the management PC 5. FIG. 6 shows the comparison information in regard to the "component B" shown in FIG. 4. As shown in FIG. 6, as for respective liquid chromatographs 2E to 2H, graphs representing information about a "use count" and a "current value" in regard to the "component B" are displayed on the monitor 505.

In FIG. 6, S2 represents a maximum allowable use count of the "component B." The maximum allowable use count S2 is defined by a component manufacturing company. In FIG. 6, T2 represents a threshold value of a current value. The component manufacturing company assumes that, in a case where the use count does not exceed the maximum allowable use count of the "component B," the current value does not exceed the threshold value T2. In other words, the threshold value T2 of the current value is a maximum allowable current value for the "component B" that is behaving normally with its use count not exceeding the maximum allowable use count S2. In FIG. 6, as for a "component B" of each of the liquid chromatographs 2E, 2F and 2H, a current value does not exceed the threshold value T2 before its use count reaches the maximum allowable use count S2. However, as for a "component B" of a liquid chromatograph 2G, the current value exceeds the threshold value T2 before its use count reaches the maximum allowable use count S2.

Thus, the operator of the manufacturing company 4 that operates the management PC 5 can visually identify that the "component B" of the liquid chromatograph 2G is not behaving normally. That is, it represents that the "component B" of the liquid chromatograph 2 needs to be replaced or maintained even though its use count does not exceed the maximum allowable use count S2. For example, it is considered that the "component B" is a defective product, and the replacement time has arrived when its use count is smaller than the presumed maximum allowable use count S2. Alternatively, it is considered that the replacement time has arrived when its use count is smaller than the maximum allowable use count S2 because the "component B" is excessively worn or deformed due to factors such as use environment or use conditions.

In FIG. 6, the graph of the liquid chromatograph 2G may be highlighted. That is, the graph of a component the current value of which exceeds the threshold value T2 (reference value) before its use count reaches the maximum allowable use count S2 is highlighted. For example, the graph of the liquid chromatograph 2G is displayed in red in contrast to the graphs of the liquid chromatographs 2E, 2F and 2H being displayed in black. Alternatively, the graph of the liquid chromatograph 2G may blink.

Figure 7:
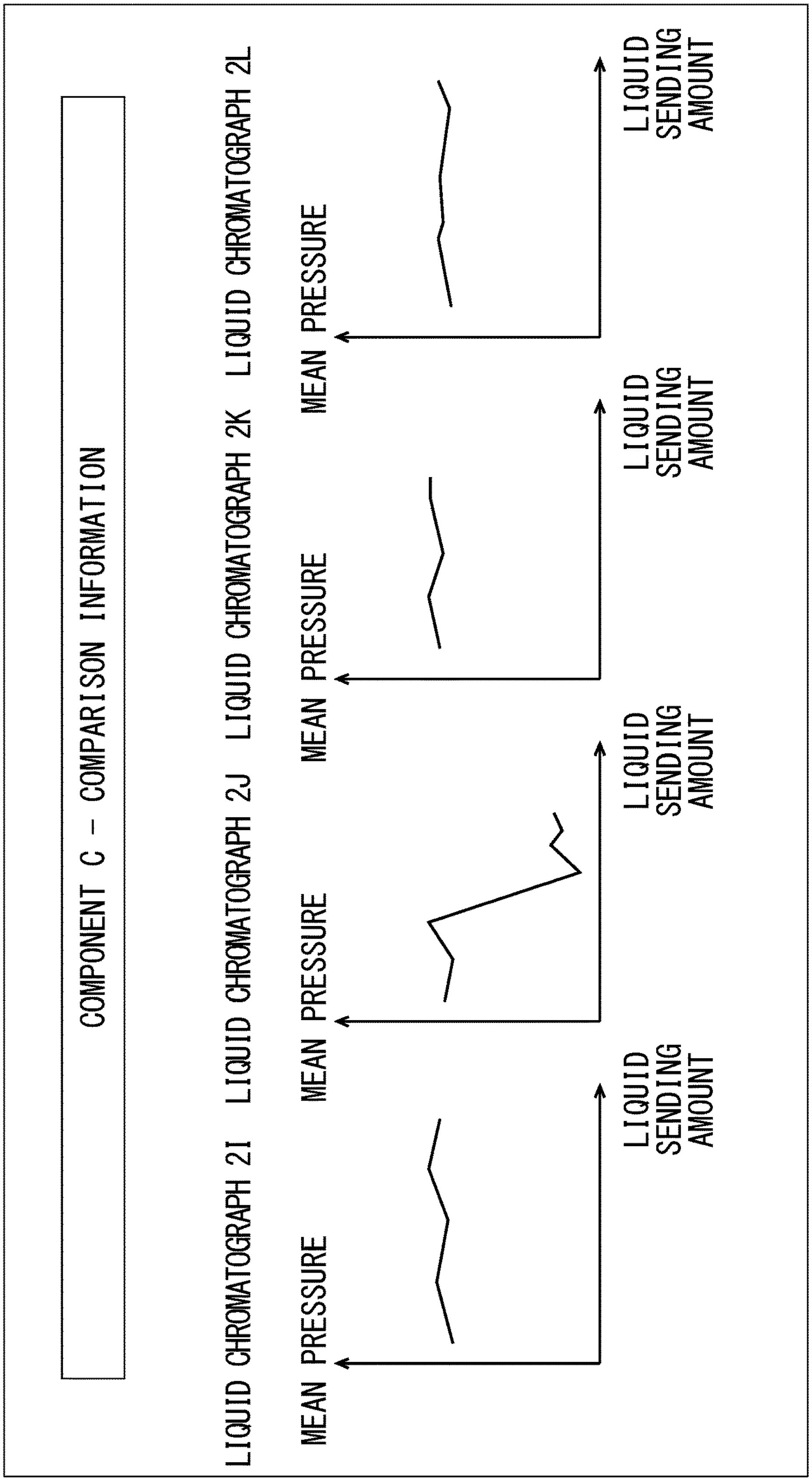
FIG. 7 is graphs showing comparison mean pressures of a component C displayed on the monitor of the management PC.

FIG. 7 is a diagram showing another example of comparison information displayed on the monitor 505 of the management PC 5. FIG. 7 shows the comparison information in regard to the "component C" shown in FIG. 4. As shown in FIG. 7, as for respective liquid chromatographs 2I to 2L, the graphs representing information about a "liquid sending amount" and a "mean pressure" in regard to the "component C" are displayed on the monitor 505. The "component C" is a liquid sending pump included in the pump unit (function unit 22).

In FIG. 7, in regard to the "component C" of each of the liquid chromatographs 2I, 2K and 2L, variations in mean pressure are in a predetermined range. However, in regard to the "component C" of the liquid chromatograph 2J, variations in mean pressure are out of the predetermined range. Whether the mean pressure is in the predetermined range is determined based on whether a dispersion value of variations in mean pressure is smaller than a predetermined threshold value, for example.

Thus, the operator of the manufacturing company 4 that operates the management PC 5 can visually identify that the "component C" of the liquid chromatograph 2J is not behaving normally.

In FIG. 7, the graph of the liquid chromatograph 2J may be highlighted. That is, the graph of a component having a dispersion value of variations in mean pressure that exceeds the predetermined threshold value (reference value) is highlighted. For example, the graph of the liquid chromatograph 2J is displayed in red in contrast to the graphs of the liquid chromatographs 2I, 2K and 2L being displayed in black. Alternatively, the graph of the liquid chromatograph 2J may blink.

The operator of the manufacturing company 4 can identify that the pump (component C) of the liquid chromatograph 2J is not behaving normally. In a case where the operator cannot identify that the pump is in such a state, and leaves the pump as it is, a seal of the pump may become further damaged, and liquid leakage or the like from the pump may occur. The operator can take measures such as replacement of the seal before liquid leakage from the pump occurs by being informed of the state of the pump in advance.

As described above, the component management system of the present embodiment provides the comparison information of the components attached to the function units 22 of the liquid chromatographs 2. The comparison information is the comparison information of the same type of components used in the plurality of liquid chromatographs 2. The operator of the manufacturing company 4 of the liquid chromatographs 2 can find out a component that needs to be replaced or maintained before a replacement time arrives by making reference to the comparison information. Alternatively, the management PC may be installed in the user's research laboratory 1, so that the user may make reference to the comparison information. Thus, the user can monitor the state of a component, and contact the manufacturing company 4 to replace or maintain the component before a liquid chromatograph 2 generates an error.

As descried in the present embodiment, in a case where the server 6 is installed in a cloud, and the management PC 5 is installed in the manufacturing company 4, the operator of the manufacturing company 4 can perform various analyses. The operator of the manufacturing company 4 can make reference to the comparison information based on various elements such as a user company, a user's research laboratory or all users. Thus, a component that does not meet a reference value in a user's company, a component that does not meet a reference value among all users, or the like can be analyzed.

(8) Component Management Method

Figure 8:
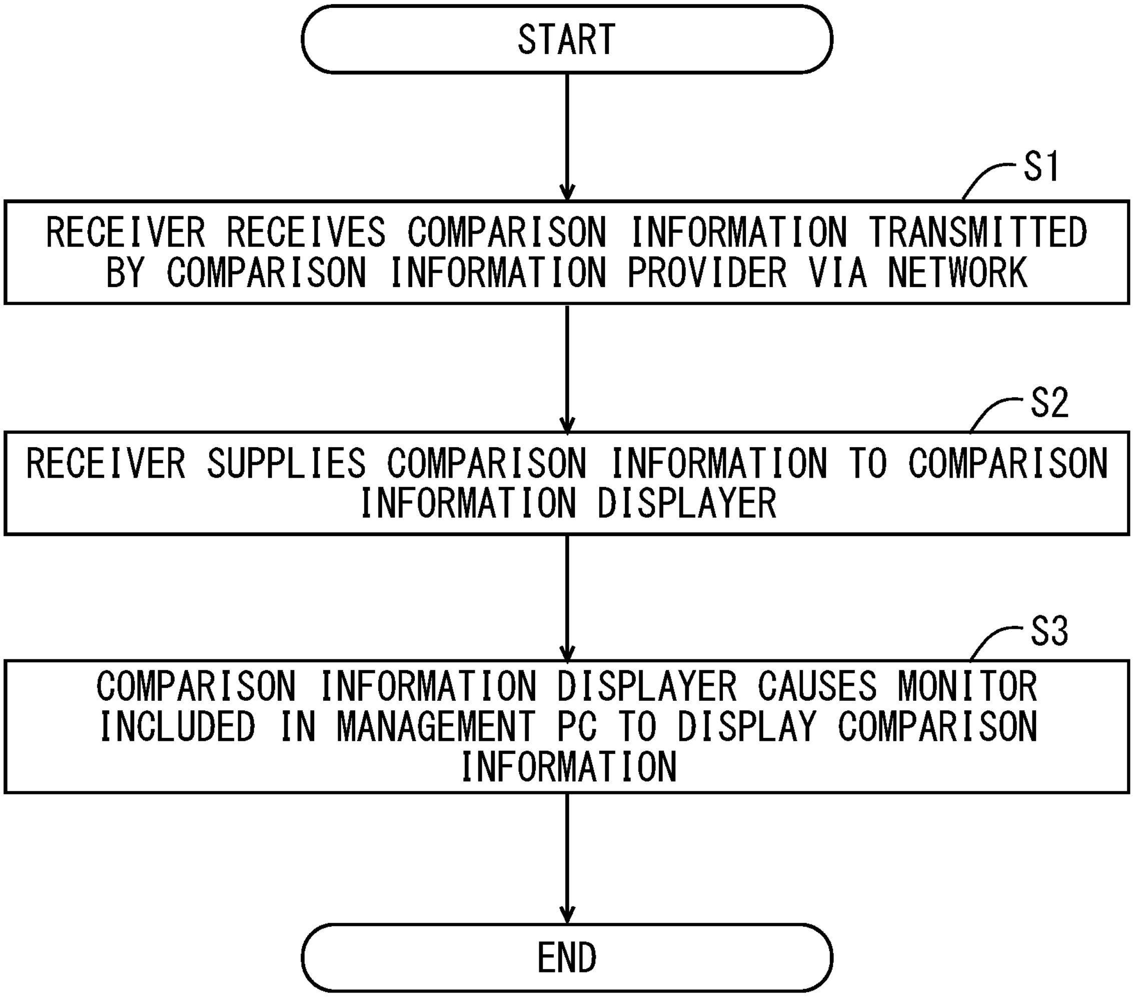
FIG. 8 is a flowchart showing a component management method.

FIG. 8 is a flowchart showing the component management method. The component management method shown in FIG. 8 is performed when the CPU 501 shown in FIG. 4 executes the component management program 510 stored in the storage device 503. That is, the component management method of FIG. 8 is a component management method to be performed for making reference to comparison information in the management PC 5.

First, the receiver 51 receives the comparison information transmitted by the comparison information provider 63 of the server 6 via the LAN 40, the gateway 41 and the WAN 3 (step S1). Next, the receiver 51 supplies the comparison information to the comparison information displayer 52 (step S2). Then, the comparison information displayer 52 causes the monitor 505 of the management PC 5 to display the comparison information as shown in FIGS. 5 and 6 (step S3). As described above, the comparison information displayer 52 may execute a process of processing the comparison information received from the server 6.

In the above-mentioned embodiment, the component management program 510 is stored in the storage device 503. As another example, the component management program 510 may be provided in the form of being stored in a recording medium 511 such as a CD-ROM. The CPU 501 can execute the component management program 510 stored in the recording medium 511 via the external interface 504.

(9) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the liquid chromatograph 2 is an example of an analysis device, and the LAN 10 and the WAN 3 are examples of a network. Further, in the above-mentioned embodiment, the threshold value of the retry count, the threshold value of the current value and the threshold value of the dispersion value of variation of the mean pressure are examples of reference values. Further, in the above-mentioned embodiment, the component A is an example of a first component, and the component B is an example of a second component. Further, in the above-mentioned embodiment, the management PC 5 is an example of a computer.

As each of constituent elements recited in the claims, various other elements having configurations or functions described in the claims can be also used.

(10) Other Embodiments

In the above-mentioned embodiment, the component management system is used as the system for managing the components attached to the liquid chromatographs 2, by way of example. The component management system of the present embodiment can be used in another analysis device such as a gas chromatograph or a mass spectrometer in addition to a liquid chromatograph.

In the above-mentioned embodiment, the management PC 5 is connected to the LAN 40 of the manufacturing company 4, by way of example. The management PC 5 may be connected to another network different from the LAN 40. For example, the management PC 5 may be connected to the LAN 10 of the user's research laboratory 1. Further, in the above-mentioned embodiment, the server 6 is connected to the WAN 3. That is, the component management system utilizes the server 6 in the cloud. The configuration is one example, and the server 6 may be installed in a user's network. For example, the server 6 may be connected to the LAN 10 to which the liquid chromatographs 2 are connected.

While preferred embodiments of the present invention have been described above, it is to be understood that variations and modifications will be apparent to those skilled in the art without departing the scope and spirit of the present invention.

(11) Aspects

It is understood by those skilled in the art that the plurality of above-mentioned illustrative embodiments are specific examples of the below-mentioned aspects. The scope of the present invention, therefore, is to be determined solely by the following claims.

(Item 1) A component management system for an analysis device according to one aspect includes a plurality of analysis devices, and a server connected to the plurality of devices via a network, wherein each analysis device includes an acquirer that acquires a use amount and a behavior information piece associated with the use amount of a component attached to each analysis device, and a transferer that transfers the use amount and the behavior information piece associated with the use amount acquired by the acquirer to the server, and the server includes a registrar that registers the use amounts and the behavior information pieces associated with the use amounts received from the plurality of analysis devices in a database, and a comparison information provider that provides comparison information, of the use amounts and the behavior information pieces associated with the use amounts of a same type of components that are used in the plurality of analysis devices, produced based on the use amounts and the behavior information pieces associated with the use amounts registered in the database.

The behavior information pieces of the same type of components used in the plurality of analysis devices can be compared to one another. Thus, the component that needs to be replaced or the component that needs to be maintained can be found.

(Item 2) The comparison information provider may specify information in regard to a component, the behavior information piece of which exceeds a reference value, among the same type of components that are used in the plurality of analysis devices.

The component the behavior information of which exceeds the reference value can be identified. Thus, the component that needs to be replaced or the component that needs to be maintained can be found.

(Item 3) The comparison information provider may provide graphs with which the use amounts and the behavior information pieces associated with the use amounts of the plurality of analysis devices are comparable.

The behavior information pieces of the same type of components used in the plurality of analysis devices can be visually compared to one another. Thus, the component that needs to be replaced or the component that needs to be maintained can be found easily.

(Item 4) The use amount may include a use count of a first component, and the behavior information piece may include a retry count, of retries that have been conducted until the first component behaves normally, that is associated with the use count of the first component.

Among the same type of components used in the plurality of analysis devices, the component having an increasing retry count can be found. Thus, although the component replaceable time has not arrived, the component that needs to be replaced or the component that needs to be maintained can be found easily.

(Item 5) The use amount may include a use count of a second component, and the behavior information piece may include electrical properties of the second component that is associated with the use count of the second component.

Among the same type of components used in the plurality of analysis devices, the component having deteriorated electrical properties can be found. Thus, although the component replaceable time has not arrived, the component that needs to be replaced or the component that needs to be maintained can be found easily.

(Item 6) The use amount may include a liquid sending amount of a pump, and the behavior information piece may include a mean pressure of the pump associated with the liquid sending amount of the pump.

Among pumps used in the plurality of analysis devices, the pump the mean pressure of which does not indicate a normal value can be found. Thus, although the component replaceable time has not arrived, the component that needs to be replaced or the component that needs to be maintained can be found easily.

(Item 7) A computer that is connected to the server according to the item 1 via a network, includes a receiver that receives the comparison information presented by the comparison information provider, and a comparison information displayer that causes a monitor included in the computer to display the comparison information received by the receiver.

The comparison information is displayed by the computer. The operator that uses the computer can manage the states of components.

(Item 8) A non-transitory computer readable recording medium storing a component management program that is executed in a computer connected to the server according to the item 1 via a network causes the computer to execute a process of receiving the comparison information presented by the comparison information provider, and a process of causing a monitor to display the received comparison information.

The invention claimed is:

1. A component management system for an analysis device, comprising:

a plurality of analysis devices; and a server connected to the plurality of devices via a network, wherein each analysis device includes a processor configured to:

acquire a use amount and a behavior information piece associated with the use amount of a component attached to each analysis device, and transfer the use amount and the behavior information piece associated with the use amount acquired to the server, and the server includes a processor configured to:

register the use amounts and the behavior information pieces associated with the use amounts received from the plurality of analysis devices in a database, provide comparison information, produced based on the use amounts and the behavior information pieces associated with the use amounts registered in the database, the comparison information comprising:

(i) use amounts, (ii) the behavior information pieces associated with the use amounts of a same type of components that are used in the plurality of analysis devices, (iii) a usable amount of the same type of component, and (iv) the reference value of the behavior information, and compare and display the use amount, the behavior information piece, the usable amount, and the reference value of the same type of components provided in the plurality of analysis devices, wherein the usable amount and reference value relate to values within normal operating limits of the analysis device, wherein a plurality of graphs is displayed for each of the plurality of analysis devices, showing the use amount, the behavior information piece, the usable amount, and the reference value as the comparison information, and the comparison information of the plurality of analysis devices is displayed side by side.

2. The component management system for an analysis device according to claim 1, wherein the processor of the server is configured to specify information in regard to a component, the behavior information piece of which exceeds a reference value, among the same type of components that are used in the plurality of analysis devices.

3. The component management system for an analysis device according to claim 1, wherein the use amount includes a use count of a first component; and the behavior information piece includes a retry count, of retries that have been conducted until the first component behaves normally, that is associated with the use count of the first component.

4. The component management system for an analysis device according to claim 1, wherein the use amount includes a use count of a second component, and the behavior information piece includes electrical properties of the second component that is associated with the use count of the second component.

5. The component management system for an analysis device according to claim 1, wherein the use amount includes a liquid sending amount of a pump, and the behavior information piece includes a mean pressure of the pump associated with the liquid sending amount of the pump.

6. A computer that is connected to the server according to claim 1 via a network, comprising:

a receiver that receives the comparison information presented by the processor of the server; and a comparison information displayer that causes a monitor included in the computer to display the comparison information received by the receiver.

7. A non-transitory computer readable recording medium storing a component management program that is executed in a computer connected to the server according to claim 1 via a network, causing the computer to execute:

a process of receiving the comparison information presented by the processor of the server; and a process of causing a monitor to display the received comparison information.

8. The component management system according to claim 1, wherein the reference value for the behavior information is the value of the behavior information allowed for a component operating normally within the usable amount.

* * * * *